United States Patent
Hirata

(10) Patent No.: US 9,704,077 B2
(45) Date of Patent: Jul. 11, 2017

(54) IMAGE PROCESSING DEVICE HAVING VOLTAGE GENERATING UNIT OUTPUTTING CONTROL VOLTAGE

(71) Applicant: Hironori Hirata, Nagoya (JP)

(72) Inventor: Hironori Hirata, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/168,358

(22) Filed: Jan. 30, 2014

(65) Prior Publication Data

US 2014/0211230 A1    Jul. 31, 2014

(30) Foreign Application Priority Data

Jan. 30, 2013  (JP) ................. 2013-015277

(51) Int. Cl.
  *G03G 15/00*  (2006.01)
  *G05F 1/00*   (2006.01)
  *G06F 3/12*   (2006.01)
  *G06K 15/00*  (2006.01)
  *B41J 29/393* (2006.01)
  (Continued)

(52) U.S. Cl.
  CPC ........ *G06K 15/4055* (2013.01); *B41J 29/393* (2013.01); *H02M 1/36* (2013.01); *H02M 3/00* (2013.01); *H02M 2001/0032* (2013.01); *Y02B 70/16* (2013.01)

(58) Field of Classification Search
  None
  See application file for complete search history.

(56) References Cited

U.S. PATENT DOCUMENTS 6,574,739 B1 *   6/2003  Kung .............. G06F 1/3203
                                            713/320
2002/0044000 A1 * 4/2002  Hatanaka ............ 327/291
(Continued)

FOREIGN PATENT DOCUMENTS

JP    11-112721 A    4/1999
JP    2001-75685 A   3/2001
(Continued)

OTHER PUBLICATIONS

Office Action issued in related Japanese application No. 2013-015277, mailed Jul. 19, 2016.

*Primary Examiner* — Moustapha Diaby
(74) *Attorney, Agent, or Firm* — Merchant & Gould P.C.

(57) ABSTRACT

In the image processing device, a power supply unit outputs a drive voltage. The control unit is driven by the drive voltage and control the image processing unit. The monitoring unit performs a monitoring operation to determine whether the receiving unit receives the operation instruction. A monitoring unit outputs an activation instruction to the voltage conversion unit when the monitoring unit determines that the receiving unit receives the operation instruction. In response to the activation instruction from the monitoring unit, a voltage conversion unit performs a voltage conversion operation for converting a voltage applied by an external power source to the drive voltage. The voltage generating unit generates a control voltage based on a voltage applied by the external power source and applies the control voltage to both the monitoring unit and the voltage conversion unit.

6 Claims, 3 Drawing Sheets

(51) Int. Cl.
  *H02M 3/00* (2006.01)
  *H02M 1/36* (2007.01)
  *H02M 1/00* (2006.01)

(56) References Cited

U.S. PATENT DOCUMENTS

| | | | |
|---|---|---|---|
| 2002/0098006 A1* | 7/2002 | Tamaoki | 399/69 |
| 2002/0149353 A1* | 10/2002 | Inaba | 323/283 |
| 2003/0020936 A1* | 1/2003 | Nakajima et al. | 358/1.9 |
| 2006/0007036 A1* | 1/2006 | Natsume et al. | 342/70 |
| 2009/0091959 A1* | 4/2009 | Takahashi et al. | 363/126 |
| 2009/0161472 A1* | 6/2009 | Wang | G11C 5/147 |
| | | | 365/226 |
| 2009/0327549 A1* | 12/2009 | Fuehrer | 710/107 |
| 2010/0073703 A1* | 3/2010 | Tamada | 358/1.14 |
| 2010/0202161 A1* | 8/2010 | Sims | H02M 7/02 |
| | | | 363/20 |
| 2010/0246224 A1* | 9/2010 | Zhang et al. | 363/123 |
| 2011/0025368 A1* | 2/2011 | Tsuchiya | 324/764.01 |
| 2011/0254632 A1* | 10/2011 | Sawada | 331/10 |
| 2011/0311237 A1 | 12/2011 | Hotogi | |
| 2011/0311260 A1* | 12/2011 | Nakajima et al. | 399/88 |
| 2012/0049832 A1* | 3/2012 | Shinyama | 323/299 |
| 2012/0173787 A1* | 7/2012 | Westwick | G06F 1/26 |
| | | | 710/313 |
| 2012/0269264 A1* | 10/2012 | Sato | 375/240.03 |
| 2012/0286696 A1* | 11/2012 | Ghanem | H05B 33/0815 |
| | | | 315/291 |
| 2013/0103963 A1* | 4/2013 | Chen | G06F 1/26 |
| | | | 713/323 |

FOREIGN PATENT DOCUMENTS

| | | |
|---|---|---|
| JP | 2002-312073 A | 10/2002 |
| JP | 2007-072626 A | 3/2007 |
| JP | 2009-251275 A | 10/2009 |
| JP | 2012-20573 A | 2/2012 |
| JP | 2012-48521 A | 3/2012 |
| JP | 2012-65388 A | 3/2012 |
| JP | 2012-133150 A | 7/2012 |

* cited by examiner

IMAGE PROCESSING DEVICE HAVING VOLTAGE GENERATING UNIT OUTPUTTING CONTROL VOLTAGE

CROSS REFERENCE TO RELATED APPLICATION

This application claims priority from Japanese Patent Application No. 2013-015277 filed Jan. 30, 2013. The entire content of the priority application is incorporated herein by reference.

TECHNICAL FIELD

The present invention relates to a technique for converting a DC voltage supplied from an external power source into a drive voltage and using the drive voltage to control processing pertaining to image processing.

BACKGROUND

There is a conventional integrated circuit having a power saving mode function. The integrated circuit includes a power-supplied circuit block and a power control circuit block. Power form a source is supplied to the power-supplied circuit block via a transistor. The power control circuit block controls the supply of power to the power-supplied circuit block. After detecting that conditions for shifting into a power saving mode have been satisfied, the power-supplied circuit block notifies the power control circuit block of that fact. After receiving the notification, the power control circuit block turns the transistor OFF (Closing operation) to cut off the supply of power from the power-source power to the power-supplied circuit block. Then, the power control circuit block monitors whether a cut-off cancellation signal is received from outside. If the power control circuit block determines that the cut-off cancellation signal has been received, the power control circuit block turns the transistor ON (Opening operation) to restart the supply of power from the power-source power to the power-supplied circuit block.

SUMMARY

However, in conventional configuration, such as described above, different regulators are used to individually generate a control voltage that is used to control a voltage conversion unit which converts the power-source voltage into a voltage for the power-supplied circuit block, and another control voltage that is used to control a monitoring unit which monitors the cut-off cancellation signal. Therefore, it is difficult to reduce the size of the circuit configuration.

In view of the foregoing, it is an object of the present invention to provide a technique for reducing the size of a circuit configuration that applies control voltage to the voltage conversion unit and the monitoring unit.

In order to attain the above and other objects, the invention provides an image processing device. The image processing device includes an image processing unit, a power supply unit, a control unit, and a receiving unit. The image processing unit is configured to perform a process concerning an image. The power supply unit is configured to output a drive voltage. The power supply unit includes a monitoring unit, a voltage conversion unit, and a voltage generating unit. The control unit is configured to be driven by the drive voltage and control the image processing unit. The receiving unit is configured to receive an operation instruction. The monitoring unit performs a monitoring operation to determine whether the receiving unit receives the operation instruction. The monitoring unit outputs an activation instruction to the voltage conversion unit when the monitoring unit determines that the receiving unit receives the operation instruction. In response to the activation instruction from the monitoring unit, the voltage conversion unit performs a voltage conversion operation for converting a voltage applied by an external power source to the drive voltage. The voltage generating unit generates a control voltage based on a voltage applied by the external power source and applies the control voltage to both the monitoring unit and the voltage conversion unit.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
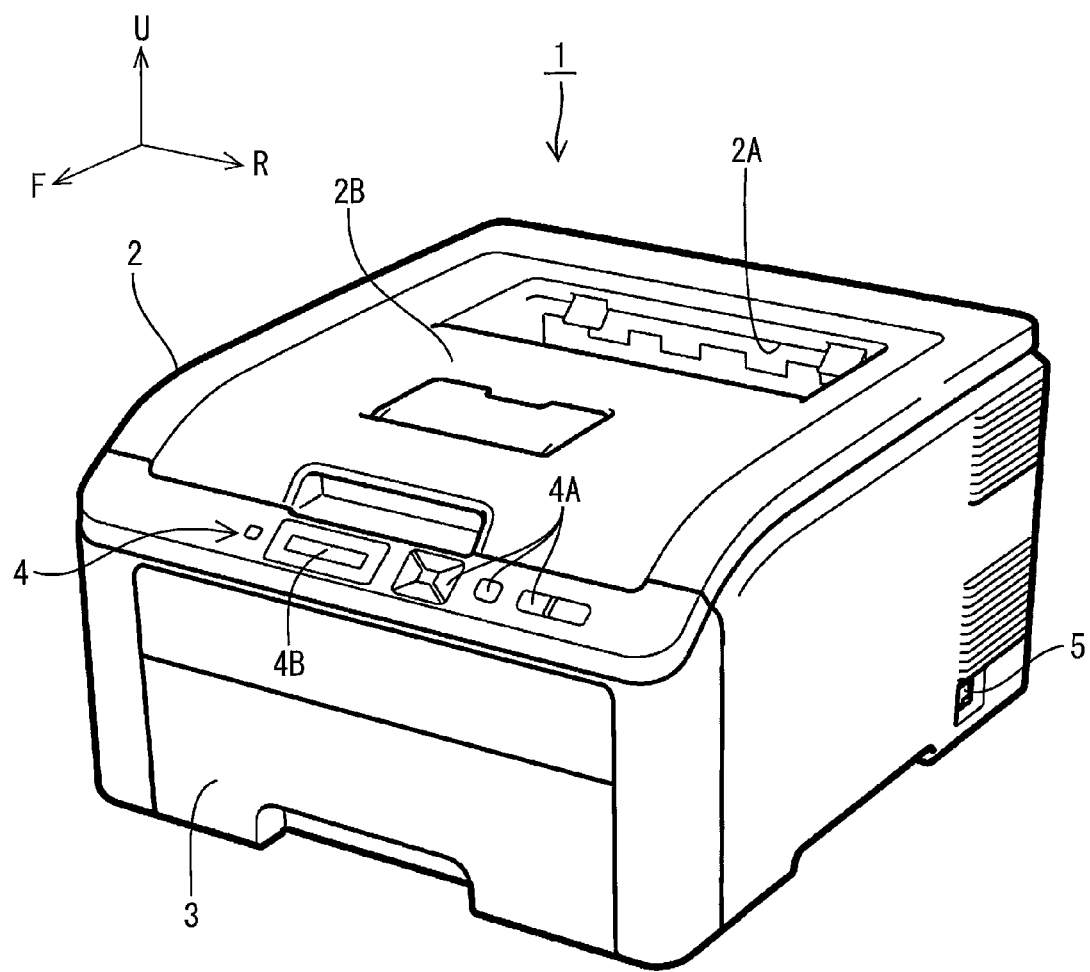
FIG. 1 is a perspective diagram of a printer according to an embodiment of the invention.

A printer 1 according to embodiment of the invention will be described while referring to the accompanying drawings. The printer 1 has a function printing an image on a sheet such as printing paper. In the following description, the terms "upward", "downward", "upper", "lower", "above", "below", "beneath", "right", "left", "front", "rear" and the like will be used throughout the description assuming that the printer 1 is disposed in an orientation in which it is intended to be used. In use, the printer 1 is disposed as shown in FIG. 1. In FIG. 1, the upper direction, the front direction, and the right direction are respectively shown by "U", "F", and "R".

(Exterior Configuration of Printing Device)

As shown in FIG. 1, the printer 1 includes a box-like casing 2. The casing 2 includes a storage cassette 3 in a bottom section thereof The storage cassette 3 can accommodate a plurality of unprinted sheets. The storage cassette 3 can be drawn forward. The casing 2 further includes a discharge opening 2A and a discharge tray 2B on an upper side thereof. Printed sheets are discharged onto the discharge tray 2B via the discharge opening 2A.

The discharge tray 2B includes an operation panel 4 at a front side thereof. A plurality of operation buttons 4A and a liquid crystal display 4B are provided on the operation panel 4. A user operates the operation panel 4 to set various kinds of operation of the printer 1 and give execution instructions. When one of the operation buttons 4A is pressed, the operation panel 4 outputs an operation signal SG1 to the monitoring circuit 21. In a lower portion of the right side of the casing 2, a power switch 5 is provided. The power switch 5 is a mechanical switch (relay).

(Electrical Configuration of Printer)

Figure 2:
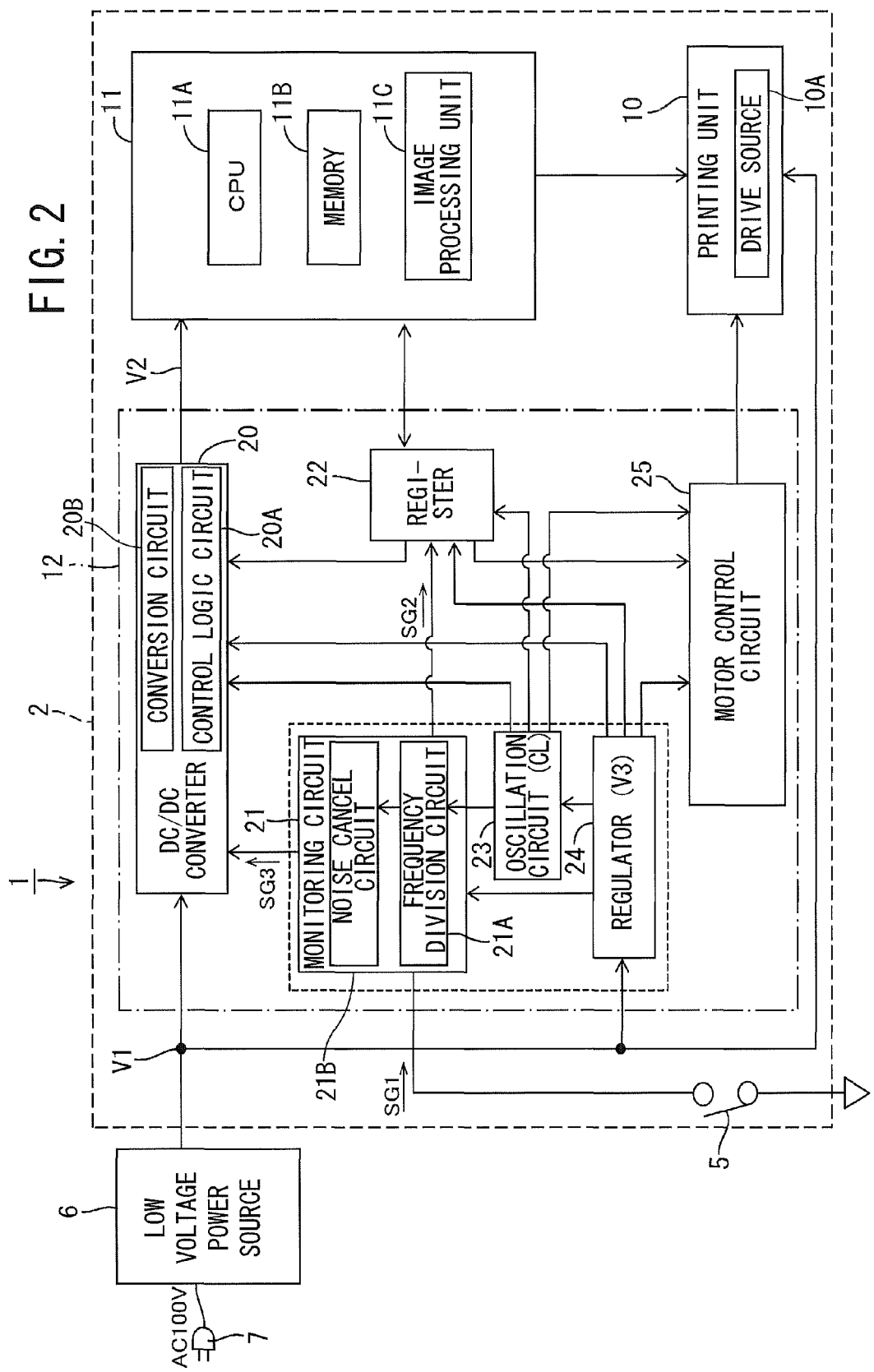
FIG. 2 is a block diagram illustrating an electrical configuration of the printer according to the embodiment.

As shown in FIG. 2, the printer 1 is connected to, for example, a commercial power source 7 via a low-voltage power source 6. The low-voltage power source 6 carries out AC/DC conversion of AC power (AC 100 V, for example) from the commercial power source 7, and outputs a DC voltage (voltage of DC power) of a first drive voltage V1 (24 V, for example). The first drive voltage V1 is a voltage required to drive a printing unit 10 and other components, which will be described later.

The printing unit 10, a printing control unit 11, and a power supply unit 12 are provided in the casing 2. For example, the printing unit 10 is a printing mechanism of an electrophotographic type or ink jettype to print an image on unprinted sheets. The printing unit 10 includes a driving source 10A. The drive source 10A include a drive motor of a conveyance mechanism that carries a sheet, and a polygon motor that an optical scanning device includes.

The printing control unit 11 includes, for example, a central processing unit (referred to as CPU, hereinafter) 11A, a memory 11B, and an image processing unit 11C. The memory 11B includes, for example, a RAM and a ROM. The memory 11B stores programs for performing various kinds of operation of the printer 1, and image data. The CPU 11A controls each section of the printer 1 in accordance with a program that is read from the memory 11B. The media in which the various programs are stored include not only the memory 11B, but also nonvolatile memories such as CD-ROMs, hard disk devices, and flash memories.

The power supply unit 12 is a composite circuit on which a plurality of circuits that perform different functions are provided. More specifically, the power supply unit 12 includes a DC/DC converter 20, a monitoring circuit 21, a register 22, an oscillation circuit 23, a regulator 24, and a motor control circuit 25.

The regulator 24 generates an internal voltage V3 (e.g., 5 V) by regulating the first drive voltage V1, and applies the internal voltage V3 to the DC/DC converter 20, the monitoring circuit 21, the register 22, the oscillation circuit 23, and the motor control circuit 25. The internal voltage V3 is used to operate (drive) the circuits 20 to 25, or is a voltage that is required to carry out control of each of the functions. Incidentally, the regulator 24 may be a linear regulator or a switching regulator.

The oscillation circuit 23 outputs a clock signal CL of a predetermined frequency, and supplies the clock signal CL to the DC/DC converter 20, the monitoring circuit 21, the register 22, and the motor control circuit 25. Incidentally, the oscillation circuit 23 can employ publicly-known various structures.

The DC/DC converter 20 carries out a voltage conversion operation in which the first drive voltage V1 output from the low-voltage power source 6 is converted into a second drive voltage V2 (e.g., 3.3 V). The second drive voltage V2 is a voltage (operation voltage) required to drive the printing control unit 11. More specifically, the DC/DC converter 20 includes a control logic circuit 20A and a conversion circuit 20B. The internal voltage V3 is applied to the control logic circuit 20A. In the voltage conversion operation, the conversion circuit 20B is applied by the first drive voltage V1 and converts the first drive voltage V1 to the second drive voltage V2. The control logic circuit 20A is able to control the voltage conversion operation of the DC/DC converter 20, such as switching operation, in synchronization with a clock cycle of the clock signal CL. In other words, the control logic circuit 20A controls the conversion circuit 20B when the voltage conversion operation is performed.

The monitoring circuit 21 can operate by the applied internal voltage V3. The monitoring circuit 21 determines whether or not one of the operation buttons 4A of the operation panel 4 is pressed. After the monitoring circuit 21 determines, based on the operation signal SG1 from the operation panel 4, that the operation button 4A is pressed, the monitoring circuit 21 outputs an ON-instruction signal SG2 to the register 22.

The monitoring circuit 21 includes a frequency division circuit 21A and a noise cancel circuit 21B. The frequency division circuit 21A outputs frequency-divide clock that is obtained by dividing the frequency of the clock signal CL from the oscillation circuit 23. The noise cancel circuit 21B is a circuit that removes a noise signal generated by chattering or electromagnetism of peripheral devices from a signal input into the monitoring circuit 21, at timing that is in synchronization with the clock cycle obtained by frequency-division of the frequency division circuit 21A. The noise cancel circuit 21B allows the monitoring circuit 21 to accurately monitor a signal generated by pushing of the operation button 4A. Moreover, the noise cancel circuit 21B uses the clock cycle obtained by the frequency-division circuit 21A. Compared with a structure in which the clock cycle that is not yet frequency-divided is used, the monitoring circuit 21 can reduce power consumed by the noise cancel operation, while appropriately determining whether the signals are noise.

The register 22 can perform a writing operation in synchronization with the clock cycle of the clock signal CL when the internal voltage V3 is applied to the register 22. The printing control unit 11 registers OFF-instruction information on the register 22. The monitoring circuit registers ON-instruction information on the register 22 by outputting the signal SG2. Here, the OFF-instruction information and the ON-instruction information are selectively registered on the register 22. The motor control circuit 25 can control to drive the drive source 10A included in the printing unit 10, at timing in synchronization with the clock cycle of the clock signal CL, when the internal voltage V3 is applied to the motor control circuit 25.

(Operation of Printing Control Unit and Power Supply Unit)

Figure 3:
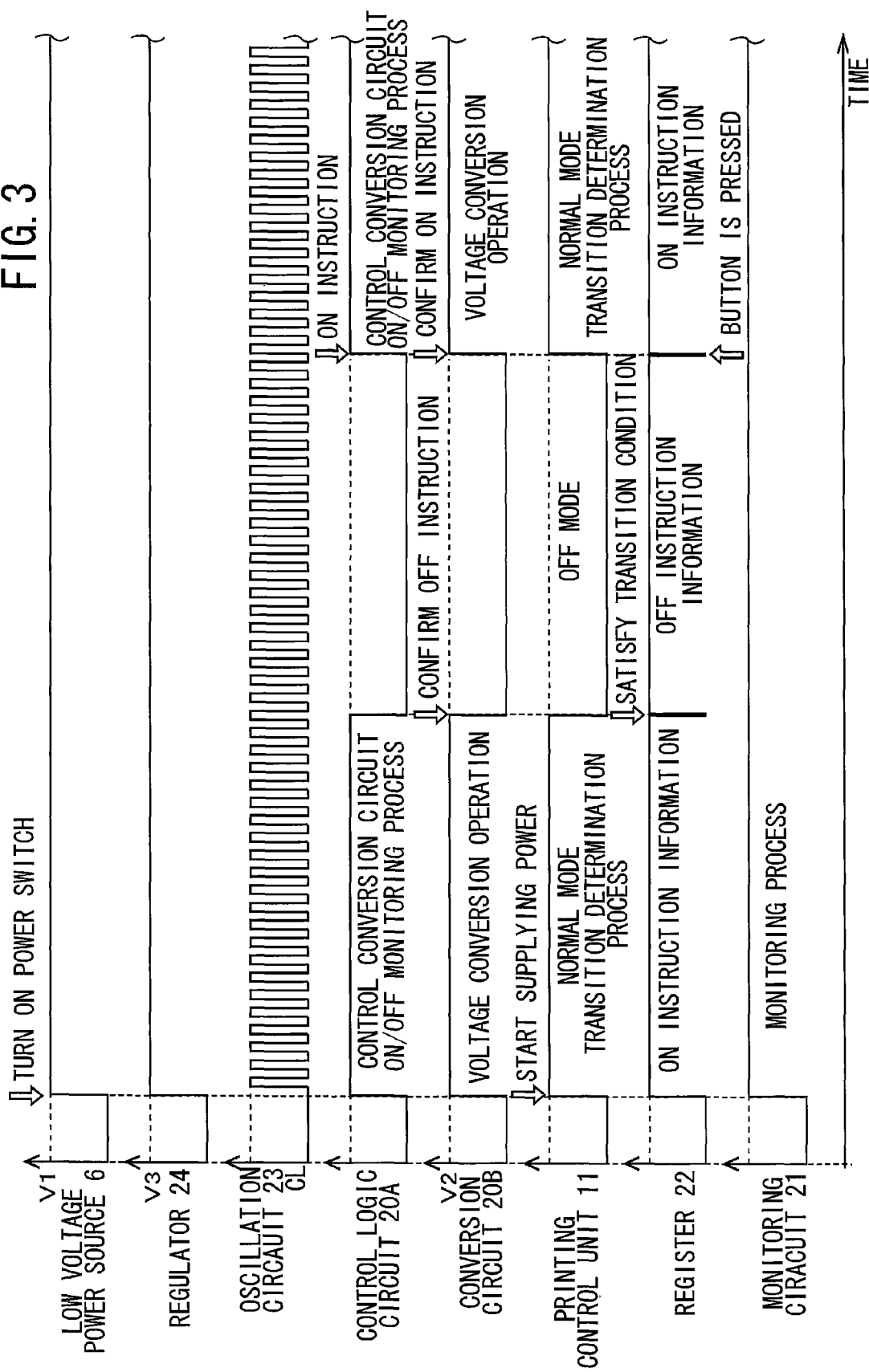
FIG. 3 is a timing chart illustrating operations of a printing control unit and a power supply unit in the printer.

After a user connects the low-voltage power source 6 to the commercial power source 7 and turns the power switch 5 ON, as shown in FIG. 3, the low-voltage power source 6 outputs power of the first drive voltage V1. Then, the regulator 24 outputs the internal voltage V3 generated from the first drive voltage V1. The oscillation circuit 23 outputs the clock signal CL when the internal voltage V3 is applied to the oscillation circuit 23.

When the internal voltage V3 is applied to the control logic circuit 20A, the control logic circuit 20A controls the conversion circuit 20B to perform the voltage conversion operation in synchronization with the clock cycle of the clock signal CL. The conversion circuit 20B begins to apply the second drive voltage V2 to the printing control unit 11. The control logic circuit 20A regularly and repeatedly carries out an ON/OFF monitoring process to check if either the OFF-instruction information or the ON-instruction signal has been written in the register 22. In a normal mode described below, the ON-instruction information is written in the register 22.

The printing control unit 11 can switch between the normal mode and an OFF mode. The normal mode is an operation mode in which the printing control unit 11 can control a printing operation of the printing unit 10 as the second drive voltage V2 is applied to the printing control unit 11. The OFF mode is a power saving mode in which the second drive voltage V2 is not applied to the printing control unit 11 and the printing control unit 11 cannot control the printing operation of the printing unit 10. The printing control unit 11 may be configured shift into not only the OFF mode, but also into another power saving mode in which power consumption is less than in the normal mode. Or, the printing control unit 11 may switch between the normal mode and another power saving mode in which power consumption is less than in the normal mode. As the second drive voltage V2 is applied from the conversion circuit 20B, the printing control unit 11 shifts into the normal mode, and, for example, the printing control unit 11 monitors, through the monitoring circuit 21, whether or not one of the operation buttons 4A is pressed. If the printing control unit 11 determines, based on the monitoring results, that printing instruction is received, then, the printing control unit 11 starts the printing operation of the printing unit 10.

In the normal mode, the printing control unit 11 regularly and repeatedly performs a transition determination process to determine whether predetermined transition conditions are satisfied. For example, the transition conditions include whether a standby state in which the operation panel 4 does not accept the user's input operations such as printing instructions continues for a reference period of time. If the printing control unit 11 determines that the transition conditions have been satisfied, then the printing control unit 11 performs a writing process. In the writing process, the printing control unit 11 writes the OFF-instruction information in the register 22.

After confirming, through the ON/OFF monitoring process, that the OFF-instruction information has been written in the register 22, the control logic circuit 20A stops the ON/OFF monitoring process, and also stops the voltage conversion operation of the DC/DC converter 20, that is, the control logic circuit 20A prevents the conversion circuit 20B from applying the second drive voltage V2 to the printing control unit 11. In this manner, the printing control unit 11 shifts into the OFF mode. The internal voltage V3 is applied to the motor control circuit 25. The motor control circuit 25 can perform an operation for controlling the drive source 10A. Moreover, the motor control circuit 25 regularly and repeatedly carries out an ON/OFF monitoring process to check if either the OFF-instruction information or the ON-instruction signal has been written in the register 22.

The internal voltage V3 is applied to the monitoring circuit 21. The monitoring circuit 21 therefore performs an operation monitoring process to determine whether or not one of the operation buttons 4A of the operation panel 4 is pressed, regardless of whether the printing control unit 11 is in the normal mode or the OFF mode. The monitoring circuit 21 may monitor, in the OFF mode, only a specific operation button 4A that functions as a soft power switch, out of a plurality of operation buttons 4A. More specifically, for example, the monitoring circuit 21 repeatedly reads operation signals SG1 in accordance with the clock cycle obtained by frequency-division of the frequency division circuit 21A.

The noise cancel circuit 21B compares a signal level of each of the inputted operation signals SG1 with an operation determination threshold value for each of the clock cycles obtained by frequency-division of the frequency-division circuit 21A. If an event in which the signal level is greater than or equal to the operation determination threshold value happens a reference number of times (e.g., three times) or more sequentially, then the noise cancel circuit 21B determines that one of the operation buttons 4A is pressed. If the number of the events in which the signal level is greater than or equal to the operation determination threshold value is less than the reference number, then the noise cancel circuit 21B determines that the signal is noise, and that none of the operation buttons 4A is pressed.

In the normal mode, the monitoring circuit 21 sequentially write the results of monitoring by the operation monitoring process in the register 22. The printing control unit 11 sequentially checks the information written in the register 22, and controls the printing unit 10 based on the checked information. In the OFF mode, if the monitoring circuit 21 determines, through the operation monitoring process, that one of the operation buttons 4A is pressed, then the monitoring circuit 21 gives a startup signal SG3 to the control logic circuit 20A, and performs a writing process to write the ON-instruction information in the register 22.

After receiving the startup signal SG3, the control logic circuit 20A restarts an ON/OFF monitoring process. Then, the control logic circuit 20A confirms that the ON-instruction information has been written in the register 22, and instructs the conversion circuit 20B to start the voltage conversion operation again, and begins to apply the second drive voltage V2 to the printing control unit 11. As a result, the printing control unit 11 goes back to the normal mode from the OFF mode.

(Advantageous Effects of the Embodiment)

According to the embodiment, the DC/DC converter 20 and the monitoring circuit 21 can operate by the applied internal voltage V3 generated by the common regulator 24. Compared with a structure in which different voltage generation units apply control voltages to the DC/DC converter 20 and the monitoring circuit 21 such as regulators, the size of the circuit configuration used to apply control voltage to the DC/DC converter 20 and the monitoring circuit 21 can be reduced. Moreover, the register 22, the oscillation circuit 23, and the motor control circuit 25, too, can operate by the internal voltage V3 generated by the common regulator 24. Therefore, the size of the circuit configuration of the entire power supply unit 12 can be further reduced, and power consumption can be reduced.

The DC/DC converter 20, the monitoring circuit 21, the register 22, and the motor control circuit 25 perform various kinds of operation by using the clock signal CL from the common oscillation circuit 23. Compared with a structure in which a plurality of oscillation units respectively dedicated for the monitoring circuit 21, the register 22, and the motor control circuit 25 are provided, the size of the circuit configuration used to output the clock signal can be reduced, and power consumption can be reduced.

The noise cancel circuit 21B reads an operation signal level in accordance with the clock cycle obtained by frequency-division of the frequency division circuit 21A, and compares the operation signal level with the operation determination threshold value to remove noise. Therefore, the DC/DC converter 20 and the noise cancel circuit 21B can use the clock signal CL of the common oscillation circuit 23, while the DC/DC converter 20 and the noise cancel circuit 21B operate in accordance with different cycles.

While the invention has been described in detail with reference to the embodiment thereof, it would be apparent to those skilled in the art that various changes and modifications may be made therein without departing from the scope of the invention.

The present invention can be applied not only to the printer 1, but also to a facsimile machine, a copy machine, or a multifunction machine that include other functions such as a scanning function along with a printing function. Or, the present invention can be applied to an image display device that displays an image on a display medium such as a display screen not shown in figures, an image scanning device that scans an image on a document sheet, or an image data processing device that makes modifications, such as conversion or editing, to image data.

Instead of the operation panel 4, as a mechanism for accepting operation instructions input by a user, a signal reception unit may be provided to accept, as operation instructions, external signals from external devices, such as the cut-off cancel signal that instructs to cancel stopping the voltage conversion operation of the DC/DC converter 20. The operation buttons 4A may be of a mechanical-button type such as push button, or be of a soft-button type such as touch panel.

Instead of the printing unit 10, a mechanism that performs processing pertaining to images may be provided, such as a display unit that displays an image on a display medium, an image scanning unit, or an image data conversion unit.

In the embodiment, the CPU 11A or the image processing unit 11C controls operations of the printing control unit 11. However, a plurality of CPUs controls the operation s of the image processing unit 11C together. Or, only hardware such as ASIC (Application Specific Integrated Circuit) controls the operations of the image processing unit 11C.

Instead of logic circuits such as the register 22, RAMs or flash memories may be provided.

Instead of the regulator 24, other publicly-known constant-voltage circuits may be provided.

Instead of hardware circuits such as the monitoring circuit 21, a CPU and a memory are provided and the CPU controls a monitoring operation. Or, a CPU and a hardware circuit control are provided, and the CPU together with the hardware circuit performs a monitoring operation together. The monitoring circuit 21 may not include a noise cancel circuit.

When the printing unit 10 include an applying circuit that applies a printing bias voltage to a photo conducting member, a voltage control circuit instead of the motor control circuit 25 may be provided to control whether or not to apply the bias voltage to the photo conducting member.

If the control logic circuit 20A confirms that the OFF-instruction information has been written in the register 22, the control logic circuit 20A may stop the voltage conversion operation of the DC/DC converter 20 while continuing the ON/OFF monitoring process.

The power supply unit 12 may have different regulator from the regulator 24. At least one of the register 22, the oscillation circuit 23, and the motor control circuit 25 may run on an internal voltage generated by that different regulator.

The power supply unit 12 may have a different oscillation circuit from the oscillation circuit 23. At least one of the register 22 and the motor control circuit 25 may be operated by a clock signal supplied from that different oscillation circuit.

What is claimed is:

1. An image processing device comprising:
an image processor configured to perform a process concerning an image;
a power supply circuit being a composite circuit that includes a monitoring circuit, a DC/DC converter, a regulator, a register, and an oscillation circuit configured to output a first clock signal to the monitoring circuit, the DC/DC converter and the register;
a central processing unit (CPU) configured to be driven by a drive voltage output by the DC/DC converter, and control the image processor; and
a button directly connected to the monitoring circuit and configured to output an on-signal, wherein the monitoring circuit is configured to detect the on-signal transmitted from the button;
wherein the DC/DC converter includes a voltage conversion circuit, and a control logic circuit configured to control the voltage conversion circuit;
wherein the voltage conversion circuit is configured to operate in a first mode in which the voltage conversion circuit performs a voltage conversion operation for converting a voltage applied by an external power source to output the drive voltage, and in a second mode in which the voltage conversion circuit does not perform the voltage conversion operation,
wherein in a case where the voltage conversion circuit is in the second mode, the monitoring circuit outputs an activation instruction to the control logic circuit when the monitoring circuit detects the on-signal transmitted from the button,
in response to the activation instruction from the monitoring circuit, the control logic circuit refers to information stored in the register and subsequently controls the voltage conversion circuit to switch from the second mode to the first mode in synchronization with the first clock signal output by the oscillation circuit;
wherein the monitoring circuit performs a monitoring operation in synchronization with the first clock signal output by the oscillation circuit; and
wherein the regulator generates a control voltage by dropping the voltage applied by the external power source to the control voltage that is used to drive the control logic circuit, the monitoring circuit, and the register.

2. The image processing device according to claim 1, wherein the monitoring circuit includes a noise cancel circuit configured to receive the on-signal from the button and remove noise from the on-signal by comparing a level of the on-signal with a noise determination threshold value.

3. The image processing device according to claim 2, wherein the monitoring circuit further includes a frequency division circuit configured to generate a second clock signal by dividing a frequency of the first clock signal output by the oscillation circuit,
wherein the noise cancel circuit receives the on-signal from the button in synchronization with the second clock signal and removes the noise from the on-signal by comparing the level of the on-signal with the noise determination threshold value.

4. The image processing device according to claim 1, wherein the power supply circuit is further configured to control the image processor in response to the first clock signal.

5. The image processing device according to claim 1, wherein the monitoring circuit stores a result of the monitoring operation in the register,
wherein the central processing unit (CPU) controls the image processor based on the result of the monitoring operation stored in the register.

6. The image processing device according to claim 5, wherein the central processing unit (CPU) stores OFF-instruction information in the register,
wherein the monitoring circuit stores ON-instruction information in the register,
wherein the voltage conversion circuit stops the voltage conversion operation when the voltage conversion circuit determines that the OFF-instruction information is stored in the register,
wherein the voltage conversion circuit activates the voltage conversion operation when the voltage conversion circuit receives the activation instruction from the monitoring circuit and determines that the ON-instruction information is stored in the register.

\* \* \* \* \*